(12) United States Patent
Mostofi et al.

(10) Patent No.: US 9,984,566 B1
(45) Date of Patent: May 29, 2018

(54) METHOD AND SYSTEMS FOR TRAFFIC SURVEILLANCE AND LAW ENFORCEMENT

(71) Applicant: Optotraffic, LLC, Lanham, MD (US)

(72) Inventors: David Keshvar Mostofi, Chevy Chase, MD (US); Cory J. Kuzyk, Akron, OH (US); Thomas Joseph Bouchard, Vienna, VA (US); Jorge Junior Brito, Silver Spring, MD (US); Andrew Edward Meade, Fredericktown, MD (US); Michael Dillon Phelan, Hollywood, MD (US); Kamal Christopher Knight, New Carrollton, MD (US); Rajendra Ramphal, Bowie, MD (US); John Edward O'Connor, Mechanicsville, MD (US)

( * ) Notice: Subject to any disclaimer, the term of this patent is extended or adjusted under 35 U.S.C. 154(b) by 0 days. days.

(21) Appl. No.: 15/405,804

(22) Filed: Jan. 13, 2017

(51) Int. Cl.
*G08G 1/017* (2006.01)
*G08G 1/052* (2006.01)
*G08G 1/056* (2006.01)
*G08G 1/054* (2006.01)
*G06K 9/00* (2006.01)
*G06K 9/46* (2006.01)

(52) U.S. Cl.
CPC ....... *G08G 1/0175* (2013.01); *G06K 9/00288* (2013.01); *G06K 9/00765* (2013.01); *G06K 9/00785* (2013.01); *G06K 9/00798* (2013.01); *G08G 1/052* (2013.01); *G08G 1/054* (2013.01); *G08G 1/056* (2013.01); *G06K 2009/4666* (2013.01)

(58) Field of Classification Search
CPC .......... G08G 1/16; G08G 1/165–1/167; G08G 1/0175; G08G 1/052; G08G 1/054; G08G 1/056; G01S 13/93; G01S 13/931; G01S 13/86; G01S 13/867; G01S 17/93; G01S 17/936; G06K 9/00785; G06K 9/00798; G06K 9/00765; G06K 9/00288
USPC ........ 340/933, 935, 937, 435; 701/300, 301, 701/400, 515
See application file for complete search history.

(56) References Cited

U.S. PATENT DOCUMENTS

2012/0306664 A1* 12/2012 Geter .................... G08G 1/166 340/903
2015/0269842 A1* 9/2015 Ignaczak ................ G08G 1/166 701/118

* cited by examiner

*Primary Examiner* — Thomas Mullen
(74) *Attorney, Agent, or Firm* — Miodrag Cekic; Intellectual Property Strategies, LLC

(57) ABSTRACT

The current invention pertains to a system and a method for detection and monitoring of traffic patterns and securely processing events of violations of Slow-Down-Move-Over (SDMO) traffic regulations on at least one designated traffic surface utilizing at least one mobile platform, equipped with at least one traffic monitoring and recording system for observation, monitoring, recording, storing and processing data pertinent to potential violations of a set of SDMO regulations, prepositioned in proximity of at least one traffic scene including the at least one traffic surface.

17 Claims, 5 Drawing Sheets

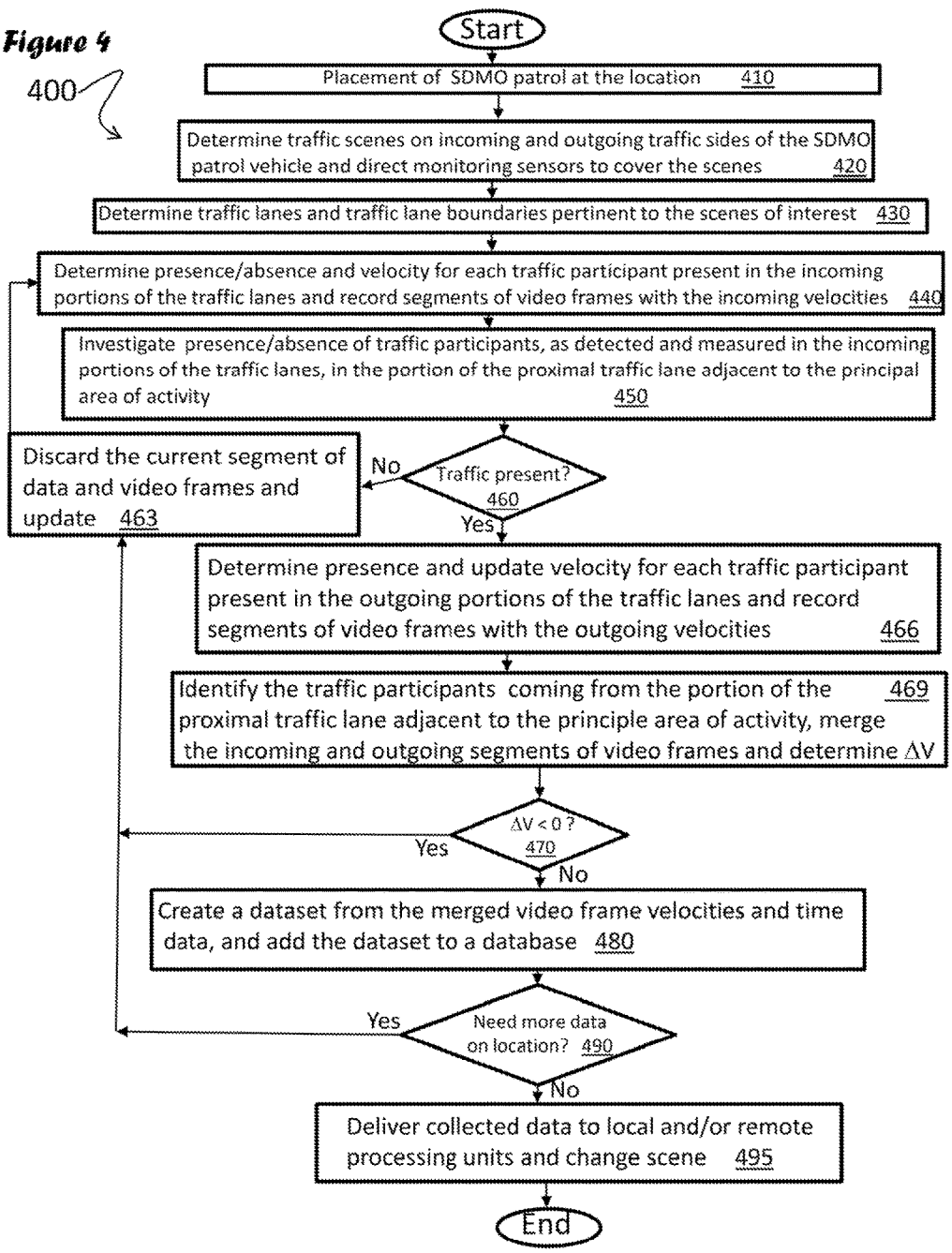

METHOD AND SYSTEMS FOR TRAFFIC SURVEILLANCE AND LAW ENFORCEMENT

CROSS REFERENCE TO RELATED APPLICATIONS

This application is related to co-owned U.S. Pat. Nos. 8,760,318; 8,629,786; 8,310,377; 7,616,293; and 7,323,987 and patent application Ser. Nos. 13/630,413; 12/546,043; 12/546,043; 11/118,540; and Ser. No. 11/150,748, all of which are incorporated herein by reference.

FIELD OF THE INVENTION

This invention relates to devices and methods for monitoring and studying traffic patterns, traffic flows and developments, and behavior of traffic participants. More particularly, the invention relates to methods and systems for monitoring and enforcing behaviors pertinent to protective regulation intended to improve safety of traffic regulators, traffic law enforcers, first responders, traffic workers and facilitators and other helpers. Even more particularly, the embodiments of the current invention pertain to detection, recording and prosecution of traffic participants' failures to reduce speed and/or to vacate, if reasonable, the proximal lanes of traffic while approaching traffic-related facilitators (including but not limited to these listed above) on duties of facilitating flows of public traffic.

BACKGROUND OF THE INVENTION

An ongoing effort to improve traffic safety by creating as-safe-as-practical traffic conditions with regard to safety of personnel involved in traffic facilitation, monitoring and/or enforcement of traffic laws and regulations generally results in a multitude of instructions, regulations and laws intended to motivate drivers to notice the traffic facilitators working in public traffic areas, reduce the driving speed ("slow down"), and/or increase the clearance between the moving traffic and traffic facilitators substantially by vacating the proximal traffic lanes executing the lane change operation ("move over") if safe and/or practical. The above desirable behaviors have been, over past decades, codified in a plurality of state laws and regulations collectively known as "Slow-Down-Move-Over" ("SDMO") requirements.

Informative overview summaries of this constantly evolving area of regulatory materials on jurisdiction-by-jurisdiction basis (e.g. state-by-state basis in the US—excluding Washington D.C., or province-by-province basis in Canada—excluding Yukon) may be found on the Internet, for example by consulting www.drivinglaws.aaa.com/tag/move-over-law/or www.moveoverlaws.com (Jan. 8, 2016). Even a cursory review of this material by an interested practitioner may generate an impression of present good intentions but apparent lack of uniformity and conceptual clarity of approaches to advance enforcement and public acceptance of the SDMO traffic requirements.

Similarly, in spite of significant development of imaging technologies for traffic studying, monitoring and enforcement, substantially no generally-accepted standards and practices have been established or adapted specifically for detecting, collecting, processing, and/or prosecution the SDMO requirements internationally (e.g. Canada and US), nationally (e.g. US, Canada, Mexico, and/or on state/provincial/territorial basis. The current embodiments of the present invention have been specifically constructed with flexibilities and options directed to serve the variety of SDMO monitoring and prosecution needs of the as large as practical set of states, provinces, territories, and/or municipalities of the United States of America and, more inclusively, North America extending to the practical limits of uniformity and standardization of traffic-related equipment and infrastructure.

In general, devices and methods of the embodiments of the present invention have been directed to detections of presence of pertinent traffic participants in particular areas of the traffic scenes (e.g. inside of the boundaries of particular traffic lane) and overall behavior of subjects involved in the pertinent traffic-related situations (e.g. intentions and/or signals to vacate the particular lane of traffic or speed reduction) which may be used for subsequent processing of collected data either locally (e.g. automatically in real time) or remotely for potential purposes of further corrective actions and/or potential future prosecution.

In addition, the methods and devices of the embodiments of current invention have been conceptualized, designed, and arranged for an enhancement of the security and confidentiality of the collected information, including but not limited to the traffic information, the information on traffic participants either actively or passively contributing to the pertinent traffic conditions, and/or accidental bystanders serendipitously present and recorded at the traffic locations and the traffic scenes of interest for the SDMO behavior monitoring and/or prosecuting.

SUMMARY OF THE INVENTION

The current invention pertains to a system for detection and monitoring of traffic patterns and securely processing events of violations of Slow-Down-Move-Over (SDMO) traffic regulations on at least one designated traffic surface. The system includes at least one mobile platform, equipped with at least one traffic monitoring and recording system for observation, monitoring, recording, storing and processing data pertinent to potential violations of a set of SDMO regulations, prepositioned in proximity of at least one traffic scene including the at least one traffic surface. The at least traffic surface includes at least one traffic line arranged and to support traffic in at least one traffic direction. The at least one traffic monitoring and recording system includes at least one subsystem for imaging of at least one traffic participant traveling in the at least one direction in the at least one traffic line, at least one processing/controlling subsystem arranged to process at least a portion of data pertinent to the potential violations of a set of SDMO regulations, and at least one communication subsystem arranged to facilitate communication and transfer of data pertinent to the potential violation of a set of SDMO regulations.

The above system may utilize a method which includes selection at least one location of interest and positioning at least one mobile platform, equipped with at least one traffic monitoring and recording system for observation, monitoring, recording, storing and processing data pertinent to potential violations of a set of SDMO regulations, in proximity of at least one principle area of activity on the at least one location of interest; determination of at least one traffic scene of interest at the at least one selected location and determination of boundaries of at least one traffic lane pertinent to the at least one principle area of activity; determination of presence/absence and an incoming velocity of the at least one traffic participant when present in at least one incoming portion of the at least one traffic lane; recording of at least one set of images and the incoming velocity of the at least one traffic participant when present in at least one incoming portion of the at least one traffic lane; and investigation of presence/absence of the at least one traffic participants detected and measured in the incoming portions of the traffic lanes, in at least one portion of the proximal traffic lane adjacent to the at least one principle area of activity.

If the at least one previously detected and measured traffic participant has been determined absent from the at least one portion of the proximal traffic lane adjacent to the at least one principal area of activity, the system abandons further observation of the at least one previously detected and measured traffic participant and abandons the previously recorded the at least one set of images and the incoming velocity of the at least one traffic participant when present in at least one incoming portion of the at least one traffic lane.

If the at least one previously detected and measured traffic participant has been determined as present in the at least one portion of the proximal traffic lane adjacent to the at least one principal area activity, the system have been prearranged to record at least another set of images and updated velocity of the at least one traffic participant and associate the above data with the at least one set of images and the incoming velocity of the at least one traffic participant when present in at least one incoming portion of the at least one traffic lane. Subsequently, the system investigates and compares a sign of difference between the updated velocity and the incoming velocity of the at least one traffic participant detected in at least one portion of the proximal traffic lane adjacent to the at least one principal area of activity and, if the sign of difference between the updated and incoming velocity is negative, abandons further observation of the at least one previously detected and measured traffic participant and abandons the previously recorded sets of images and the velocities of the at least one traffic participant. If the sign of difference between the updated and the incoming velocities is not negative, the system indicates and records a significant probability of violation of SDMO traffic regulations, and assembles and formats the recorded sets of images and velocities into at least one database entry pertinent to and associated with the at least one traffic participant.

BRIEF DESCRIPTION OF THE DRAWINGS

The above and other embodiments, features, and aspects of the present invention are considered in more detail in relation to the following description of embodiments shown in the accompanying drawings, in which:

FIG. 4 is a flow chart illustration of a method usable with one or more disclosed embodiments in accordance with the present invention.

DETAILED DESCRIPTION OF THE INVENTION

The invention summarized above and defined by the enumerated claims may be better understood by referring to the following description, which should be read in conjunction with the accompanying drawings of particular exemplary embodiments. This description of the illustrated embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also understand that such equivalent assemblies do not depart from the spirit and scope of the invention in its broadest form.

One embodiment of the current invention apparatus and method pertinent to detection, processing and prosecution of the SDMO violations on at least one traffic surface prearranged and designated to support traffic have been based on mobile platforms (e.g. traffic enforcement patrol cars) equipped with observation, monitoring, recording, and data storage equipment considered to be in common usage for traffic monitoring and enforcement. In one example, such approach may benefit from flexibilities and efficiencies of economy of scale in purchasing and maintenance of plurality of commercial video cameras, speed measuring devices, and/or digital storage media. In addition, further economic benefits may be realized in commonality of training and flexibility of deployment of operators and handlers of such commercial equipment.

Figure 1:
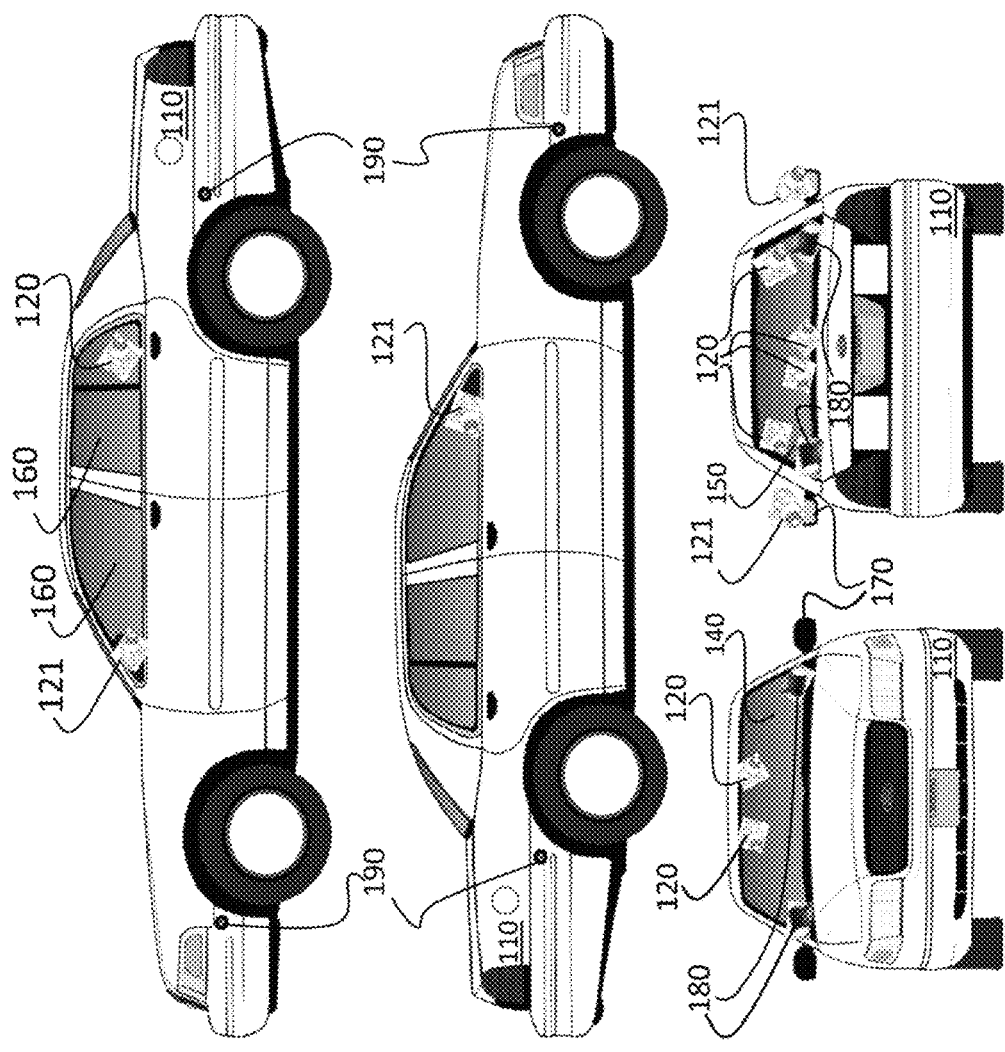
FIG. 1 is a schematic illustration of an exemplary embodiment of a system in accordance with the present invention.

One example of the mobile platform based on customary traffic monitoring patrol vehicles 110 has been illustrated in orthogonal projections in FIG. 1. In the illustrated embodiment, a plurality of internally mounted video cameras 120 have been arranged to provide sufficient coverage of relevant traffic scenes when the vehicle 110 has been positioned at rest generally alongside (alternatively on the either side) of a traffic supporting surface. Numbers of internally mounted video cameras 120 may vary in different embodiments from a single camera, usually arranged for flexible installation on the front or rear windshield of the patrol vehicle 110, to multiple cameras associated with multiple transparent elements of the patrol vehicle 110. It may be customary to position a pair of video cameras 120 in a proximity of upper edge of the front windshield 140 to cover the outgoing traffic when the patrol vehicle 110 is positioned on the left side or on the right side relative to the direction of the traffic flow (e.g. in a parking lane along in the traffic lanes of a divided highway in the direction of associated traffic flow, or in the median of the divided highway) and arranged to monitor and/or record outgoing traffic participants in accordance with the methods of the current invention. Similarly, it may be customary to arrange several internal cameras 120 in appropriate positions relative to the rear windshield 150, capable to monitor and record incoming traffic in several traffic lanes when the patrol vehicle 110 has been parked in the direction of the associated traffic flow on the either side of the traffic lanes.

It should be noted that the number of internally mounted video cameras 120 may not be limited by spatial and/or economic considerations at least because of moderate size and cost of, for example, AXIS F1005-E sensor units commercially available from the US Office (Chelmsford, Mass.) of Axis Communications AB of Sweden (Emdalavägen 14; SE-223 69 Lund). In many embodiments the optimal arrangements of video cameras (internal 120 and/or external 121) may be decisively influenced by data processing and/or handling features, and capabilities of users to utilize the available equipment.

In the embodiment illustrated in FIG. 1, the patrol vehicle 110 may include internal video cameras 120 operatively arranged on flexible mounts and surfaces just inside the transparent windshields (e.g. front windshield 140 and/or rear windshield 150) and windows 160. In many embodiments the internal video cameras may be clustered in the proximity of the rear windshields 150, having in mind relative importance of the data pertinent to the incoming traffic participants either in the case of mobile traffic monitoring or when the monitoring may be performed from the stationary patrol vehicles 110 oriented in the direction of the proximal traffic flow.

In some embodiments represented by FIG. 1, external video cameras 121 may be utilized, for example in association with the external rear view mirrors 170 in order to benefit from the factory-provided adjustable mirror mounts and/or mirror orientation adjustment subsystems. In such embodiments, external video cameras may be operated autonomously (i.e. having internal power storage, internal memory module, and preprogrammed or remotely controlled modes of operation), or connected to internal portions of the system via wired connections running, for example, through the base of the rear view mirror 170.

In addition to the video camera-based detection, monitoring and enforcements of the SDMO laws and regulations, many embodiments of the current invention may also utilize electromagnetic wave radar devices 180 (e.g. SI-3 K Band Radar commercially available from Decatur Electronic Europe Inc. of Kokkola, Finland) to detect presence and measure velocities of traffic participants associated with particular traffic lanes. In different embodiments, radars 180 may be used in support of internal and external video cameras 120 and 121 for SDMO requirements monitoring and enforcement (e.g. as additional indicators of presence and speed of traffic participants or, as additional velocity calibration and confirmation subsystems).

One may note that in some embodiments separate confirmation of presence of any traffic participant in the particular proximal traffic lane (independent and separate from either imaging devices and/or speed measurements) may be of interest. Some embodiments may use at least one prearranged proximal presence detection subsystem 190 integrated into the patrol vehicle 110. One example of the above way to establish such proximal presence during particular time periods of interest may be by usage of dedicated detection subsystems commercially available for purposes of blind spot monitoring. For example, Premium Blind Spot Detection System #BSDS-003016p commercially available from GOSSHERS of Los Angeles, Calif. (www.goshers.com; Aug. 30, 2016) may provide convenient detection range (substantially up to 20 feet from the front or back end of the patrol vehicle 110), for detection of the presence of traffic participants in immediate vicinity of the traffic monitoring patrol vehicles 110, without unwanted disturbances caused by more distant events.

In such embodiments, the at least one prearranged proximal presence subsystem 190 may be preprogrammed to record and store indicators of presence of the detected traffic participants in a data record containing time markers indicative of particular time periods such that stored data records may be positively associated with data recorded by the video cameras 120 and 121 and/or electromagnetic waves radars 180. Thus, proximal presence of the particular traffic participant having identifiable video and velocity records may be independently established or reconfirmed by the at least one proximal presence subsystem.

As illustrated in FIG. 1, four bumper-mounted acoustic sensors for the at least one prearranged proximal presence subsystem 190 may be arranged to detect, in about 120 ms, presence of a proximal cars or trucks while being preprogrammed to be insensitive to bicyclists, pedestrians, or other random stationary or slowly drifting objects or obstacles. The detection signal from the system 190 may be processed using a commercial processing unit, or integrated in centrally-controlled data processing subsystems.

In different embodiments the proximal presence detection systems 190 may be arranged to operate semi-autonomously (i.e. using co-located power storage or data processing and storing units) but arranged to functionally cooperate with the monitoring patrol vehicle 110—installed subsystem by intercommunicating information, data, and/or processed results either using wired information conduits or communication in wireless communication modes.

Figure 2:
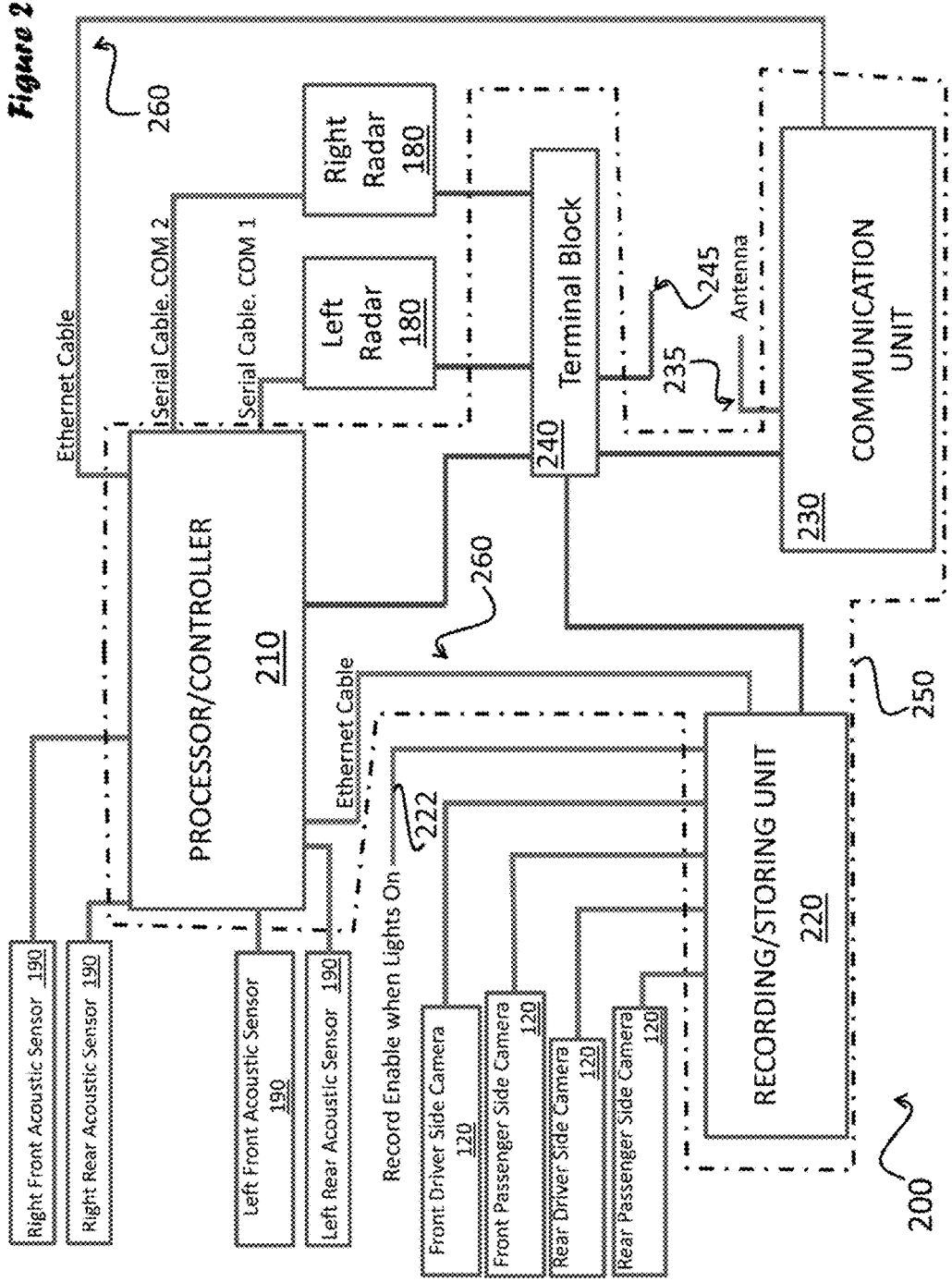
FIG. 2 is an illustration of a schematic representation of several electronic features of the system of FIG. 1 in accordance with the present invention.

One conceptual schematic of a system in accordance with the current invention has been illustrated in FIG. 2. The embodiments represented by FIG. 2 have been conceptualized for substantially autonomous operation on-board of individual traffic monitoring patrol vehicles 110. In the illustrated embodiments the data relevant for the detection, processing, and prosecution of the SDMO violations may be collected, processed, and stored on-board of the patrol vehicle 110, being transferred or communicated out to external segments of a traffic regulation system when convenient, desired, or requested.

It should be noted that in different embodiments of the current invention a distributed-interaction (networked, cellular, or nodal) SDMO violation processing system may be arranged to function as a Machine-to-Machine "M2M" network having substantially all elements of FIG. 2 positioned conveniently in a distributed manner and networked to operate distributedly (for example as an Internet of Things "IoT" arrangement or its subsystem).

The system 200 illustrated in FIG. 2 is organized around at least one digital processor/controller 210. In many embodiments controlling and processing functions are commensurate with commercial (industrial) microprocessors and corresponding microcomputers. In one class of embodiments, an Echo 87F Industrial with Fanless Mini PC with Intel® Core™ i7 (Broadwell-H) CPU are used as the digital processor/controller 210 and programmed to perform processing and controlling functions. It may be noted that many other commercial and well-known computers, microprocessor boards, programmable logical devices, programmable communication devices, and combinations of such may be used to perform controlling and processing functions in different embodiments of systems in accordance with the current invention.

It also may be noted that the classes of embodiments, as illustrated in FIG. 2, incorporate at least one recording/storing subsystem 220 arranged to pre-process and store data generated by the video cameras (either internal 120 and/or external 121), while the information acquired, for example, by acoustic sensors 190 and/or radars 180 may be processed by and stored directly in the least one digital processor/controller 210. It may be recognized by practitioners that such an arrangement may result from embodiments-specific design decisions, and should not be taken as limiting features of the current invention.

Similarly, embodiment-specific choices resulting in the arrangements incorporating at least one communication unit 230 (e.g. 4G LTE modem or router), arranged to facilitate convenient communication functions (e.g. data transmissions or networking connectivity) with external systems and/or networks, for example wirelessly via at least one antenna 235 may not be included in other embodiments. Also, the functionality of at least one terminal block 240 arranged to centrally initiate and continuously energize the subsystems of the at least one recording/storing subsystem 220 via direct user's action may be unnecessary in some alternative embodiments, e.g. being substituted by functions of prearranged, automatic, and/or remotely-controlled processes.

Finally, in yet another class of embodiments, the several subsystems including 210, 220, 230, and 240 may be grouped, collocated, and/or integrated on at least one common electronic unit (board) 250, e.g. for conveniences of compactness and/or improved reliability of such installations. Consequently, in such embodiments at least some of the Ethernet cables 260 may be replaced with appropriate on-the-board surface connections.

Some features of at least a part of the FIG. 2 illustrated embodiment are pertinent to automatic enablement of the at least one recording/storing subsystem 220 (for example via signals transmitted along a separate record enablement conductor 222) when official vehicle identifying and warning light signals (e.g. police vehicles' red-white-blue lightbars) have been powered and illuminated. This particular feature may be found beneficial under common scenarios when prompt and energetic actions to support traffic safety may be needed or desired. Under such circumstances, the automatic enablement of video cameras 120, 121 and recording/storing subsystem 220 may be in public interest. Consequently, in order to prevent unnecessary expenses and storage capacity consumptions when the light signals should be powered but data recording may not be needed, the automatic enablement may be overruled in some embodiments, for example by intentional operator's action of pushing a "disable" button arranged to turn off the recording devices (while still keeping all devices on). In different embodiments the automatic enablement feature may be augmented with variety of "saving features" based on preprogrammed or real time user-initiated actions of effectively cutting the system power supplied via at least one power conduit 245 ultimately connected to the traffic monitoring patrol vehicle 110 electrical energy supply subsystem.

Figure 3:
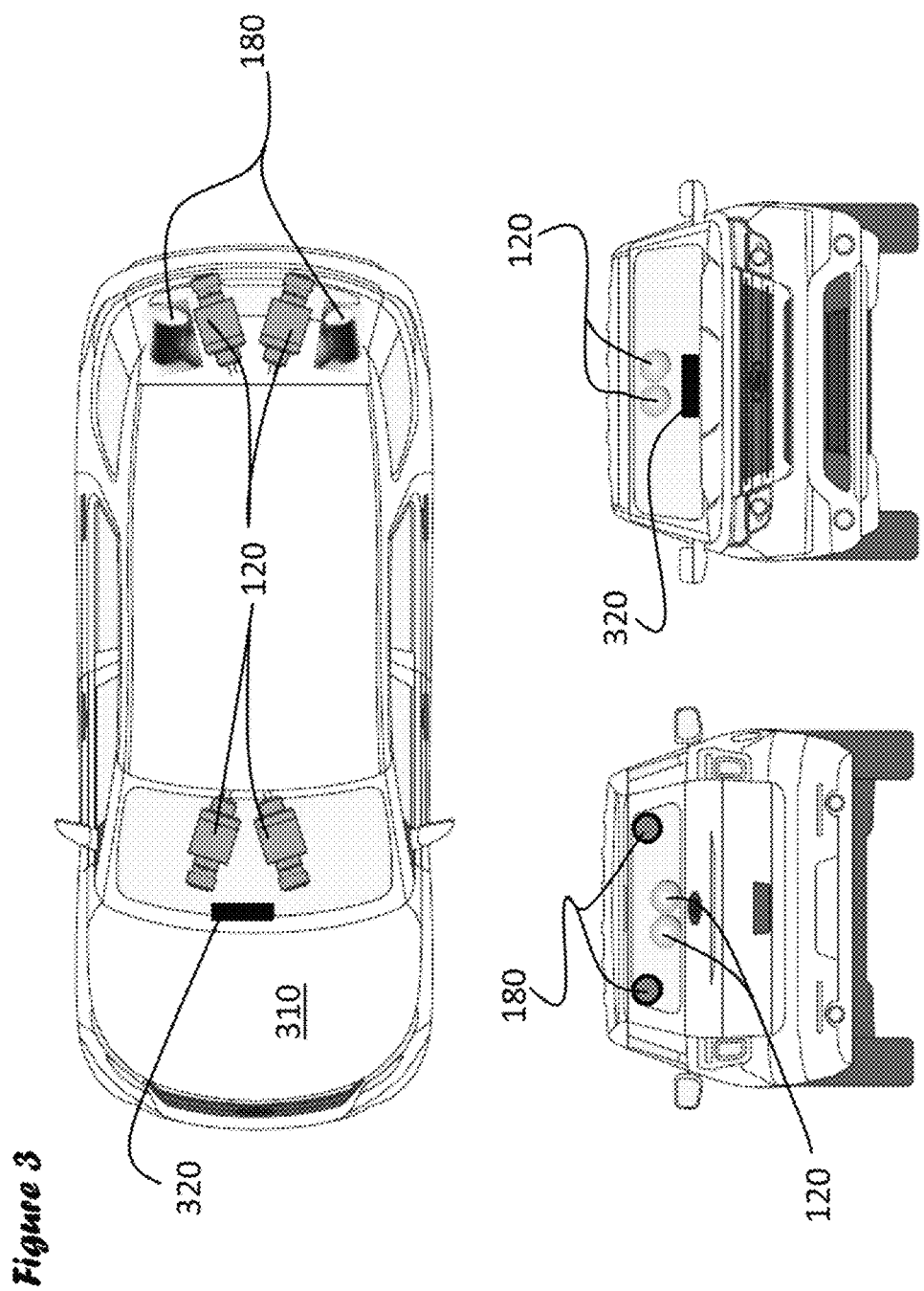
FIG. 3 is a schematic illustration of additional exemplary features of the system of FIG. 1 in accordance with the present invention.

Additional specific embodiments of the current invention have been illustrated in FIG. 3. Such embodiments may be characterized by features pertinent to flexibility, portability, and ease of utilization of modular (i.e. portable and reusable) systems for detecting, recording, processing, and prosecution of the SDMO. The modular systems of such embodiments may be compatible with common utility vehicle 310 arranged to provide support (e.g. provide removable mechanical mounts and/or electrical energy and data conduits) to at least one integrated, autonomous, and portable SDMO monitoring device without a need to significantly alternate structure, organization, other specialized equipment, or general functionality of the host vehicle 310. The devices of FIG. 3 illustrated embodiments may include internally mounted video cameras 120 and electromagnetic waves radars 180 integrated around a personal computer based controlling and processing assembly 320 compatible with docking installations commonly present in or modularly adaptable with many official or commerce-supporting utility vehicles 310, including, but not limited to, medical support vehicles, traffic inspection and maintenance SUVs and trucks, traffic signalization supporting and maintenance vehicles, infrastructure inspection vehicles, cleaning (mechanical, biological and chemical) decontamination vehicles, firefighting and disaster-response vehicles, working teams and crews transporting vehicles and combinations of above.

In the embodiments represented by the FIG. 3 schematics, the utility vehicle hosting at least one modular SDMO system may be positioned in the vicinity of clearly identifiable traffic enabling or supporting equipment or personnel under support and SDMO protection such that the on-board devices may monitor both the traffic participants and the setup under protection. The entire process of traffic monitoring and potential SDMO violation recording may be performed from relative safety of monitoring vehicles' interiors, or be conducted automatically without the need of operator's presence or supervision. In such applications, the protection providers may set up the system to detect the velocities of incoming traffic participants using at least one electromagnetic waves radar 180, while the spatial and temporal relationship between potential SDMO violators and the personnel and equipment under protection may be determined from video recordings obtained by the internal video cameras 120.

A flow chart diagram illustrating one exemplary usage of some of the aforementioned embodiments for defecting, recording, processing, and prosecution of the SDMO in accordance with the present invention has been given in FIG. 4. One should note that practitioners of traffic regulation and control may modify any or all of illustrated steps, for example to optimize coverage and efficiency of the SDMO prosecution to conform to particular characteristics of selected traffic situations under observation and protection.

The initial step 410 of SDMO violations detecting, recording, processing, and prosecution may include selection (either approximative or more deterministic) of a particular traffic location or scene in need of support or of interest for protection. This may be pertinent to planning of particular maintenance, observation, regulation, or research activities directed toward traffic support or improvements. In different embodiments, the locations of interest may be selected in response to the instant circumstances of particular traffic situations caused by traffic accidents, natural, and/or participant-induced emergences. In other embodiments, the traffic monitoring patrol vehicles 110 may use SDMO-related devices for self-protection of associated personnel at least part of which may be involved in traffic enablement, regulation, or prosecution of other, SDMO-unrelated, traffic violations.

Following step 420 pertains to determination of traffic scenes of interest at the location as selected in the step 410, which includes positioning of the at least one SDMO detection, processing, and enforcement system at the location in proximity of the traffic scenes of interest. In the cases of aforementioned embodiments that may be achieved by parking of the at least ene patrol vehicle 110 on the accessible side of the road surfaces arranged to carry the traffic of interest. The patrol vehicle 110 may be substantially oriented either to face the incoming traffic in the closest traffic lane or in the opposite orientation (i.e. faced in the direction of outgoing traffic). In such embodiments video cameras 120, 121 may be arranged to record traffic participants approaching and exiting the traffic scene 500 of interest either in front or behind (depending upon the particular orientation) the at least one patrol vehicle 110.

In the embodiments where the SDMO support may be provided to other traffic facilitators not closely collocated with the at least one patrol vehicle 110, the traffic scenes of interest may be selected such that at least a principle area of activity of the traffic facilitators (e.g. traffic check-up point, ambulance's or medical evacuation vehicle's location, main construction area, etc) have been substantially located in between portions of traffic surfaces 501 supporting incoming and outgoing traffic. In a subclass of such embodiments the SDMO support may be provided by several separated patrol vehicles 110, or, yet in other subclasses, the observation subsystems, like external video cameras 121 and/or electromagnetic wave radars 180 may be dislocated from the at least one patrol vehicle 110 in order to provide sufficient coverage up front and behind the principle area of activity of the traffic facilitators.

In the least complex traffic pattern circumstances, the traffic pattern under SDMO considerations may be supported only by a single traffic lane (i.e. the traffic lane associated with one-way roads, streets, or passages) boundaries of which may be determined in the step 430. More complex traffic patterns may be observed by video cameras 120 or 121 arranged to identify, detect, and record of at least one set of images (e.g. a section of video-recording) of traffic participants inside of the predetermined sets of boundaries of several traffic lanes arranged to support traffic in common or opposite directions (or any reasonable combination of such).

Subsequent step 440 includes recording of sets of images (e.g. sets of frames of representing segments of video recordings) indicative of present traffic participants and determination of velocities of the traffic participants present in the incoming (relative to the patrol vehicle 110 and/or the at least one principal area of activity of the traffic facilitators) portion of each traffic lane. In the above embodiments, incoming velocities of detected traffic participants as individually associated with each incoming portion of the traffic lanes may be determined on a consecutive basis for a predetermined period of time, for example using electromagnetic wave radars 180 measurements, and recorded together with each contemporary segment of co-recorded video frames. The recorded segments may be stored in a buffer section of the least one recording/storing subsystem 220 and preserved to be available for further processing.

The following step 450 includes determination of presence of traffic participants (as detected in the incoming portion of the traffic lanes) in the proximal portion (relative to the patrol vehicle 110 and/or the at least a principle area of activity of the traffic facilitators) closest to the traffic facilitators or traffic law enforcers. This step may be enabled by the proximal presence detection systems 190 utilizing aforementioned acoustic sensors for direct detections of signals generated by the direct reflection from the proximal traffic participant.

In different embodiments, presence of the traffic participants in the proximity of the patrol vehicle 110 and/or the principle area of activity of traffic facilitators may be deduced conclusively, for example based on continuation principle. Namely, if the particular traffic participant have been detected and timed in the incoming portion of the proximal traffic lane (e.g. using video cameras 120 and/or electromagnetic waves radar 180) and subsequently detected and timed (e.g. second or two later) in the outgoing portion of the same proximal traffic lane (e.g. using the video camera 120 and/or electromagnetic waves radar 180 arranged to monitor in substantially opposite direction) it may be determined that the particular traffic participant could not perform multiple lane changes in the available intervals of time and space, and therefore may be suspect for SDMO requirements violations.

The decision step 460 decides future actions on the data segments including images (e.g. video frame segments) indicative of the presence of incoming traffic participants and associated velocities. In accordance with the recitations and interpretations of the various local and state SDMO laws and regulations, the absence of the particular traffic participant from the proximal portion of the traffic lane directly adjacent to the principle area of activity of the traffic facilitators may be taken as probable indication of SDMO rules observation by the particular traffic participants. Therefore, the "No" branch of the decision 460 may properly lead to the step 463, which includes secession of observations of the above traffic participants and abandon or recycle (e.g. discard by marking pertinent files as "erased" or by intentional overwriting of memory) of the images (video frames and segments) and velocity recordings and/or erasing or over-writing pertinent memory contents including recorded data, addresses, pointers etc. Consequently, the step 463 may return of the process 400 to the step 440 if the continuation of SDMO support on the selected location has been required.

In contrast, the "Yes" branch of the decision 460 initiates further data acquisition and processing step 466 starting, for example, with determination of presence of each traffic participants in the outgoing portions of the traffic lanes of interest. In particular embodiments, such determination may result, for example, from processing of segments of video recording acquired by the internal 120 or external 121 video cameras arranged to monitor the outgoing portions of the traffic lanes of interest. Such processing may be achieved on a "frame-by-frame" basis, including identification of corresponding video frames by comparison of segments of video frames that record the incoming and the outgoing traffic participants.

In the corresponding frames one may detect subsets of substantially connected pixels having particular color, brightness, and/or contrast attributes, and follow the detected features through the subsequently recorded outgoing segments of video frames.

In different embodiments, one-to-one determination of particular traffic participants in incoming and outgoing video records may be achieved using one of many known feature extraction methods and image analysis software. One direct method may include finding of particular license plates in the incoming segments of video frames, respectively reading them in each separate frame using alphanumeric recognition image analysis software modules, and comparing these results with corresponding readouts from the plates in outgoing segments of recorded video. Similarly, in the above or different embodiments other features may be extracted and compared, including but not limited to: features and shapes characteristic for particular type of make of vehicles; characteristic trademarks displayed on the vehicles; shapes, positions and mutual orientations of light sources on particular traffic participants; sizes, shapes, arrangements, and displacements of wheels, rims, tires, hubcaps, wheel covers, wheel skins, axle and wheel nut caps and covers, and combinations of the above.

It may be noted that the above steps or sequences of steps may be utilized in different embodiments for independent determination or confirmation of traffic participants' velocities and/or accelerations. Namely, positive identification of the individual traffic participants in subsequent or following (i.e. recorded after known time delays) video frames can provide special measure of the progress (i.e. length of traveled path) of the aforementioned traffic participants over several video frames. Having in mind that the frame rates of video cameras are usually known or readily determinable, determination of frame-to-frame average velocity and/or acceleration of each identified traffic participant may be determined or approximated with measurable accuracy in usual manners.

The step 469, following the identification of the presence and determination of updated (outgoing) velocities of the identified outgoing traffic participants includes correlation of the pertinent velocity information and determination of the velocity increments Δv (defined customarily as the difference between the outgoing and incoming velocities) for each participant in the outgoing portion of the adjacent traffic lane in proximity of the principle area of activity. The decision step 470 determines with preselected probability the sign of velocity change Δv (increment for positive Δv or decrement when Δv is found to be negative). The "Yes" branch of the decision 470 may indicate drawing behavior in accordance with the SDMO requirements, regulations and laws, and, consequently leads to return to steps 463 and 440 resulting in no preservation of records and data sets. In contrast, "No" finding resulting from the decision 470 may indicate significant probability that the SDMO regulations have be violated and may cause further processing of collected information toward potential prosecution of such.

In many embodiments at least partial processing 480 of collected data may be performed locally after significant probabilities of SDMO violations have been found. Such processing may include creating computer records having predetermined structures and formats. In addition, reasonable amount of data compression may be performed, for example to facilitate, addressability, storage, retrievals, and subsequent processing. Furthermore, the records may be organized as database entries and entered in at least one database for further facilitation of short and long term usage of the collected data.

Finally, a decision 490 may be needed to terminate monitoring and processing of SDMO regulation at particular location. If such determination have been generated and implemented, the deployed monitoring devices may be collected and relocated, e.g. by relocating the patrol vehicle 110. It may be noted that, in many embodiments, such an action may not interrupt or postpone additional in-place data processing 495, as the digital processor/controller 210 may continue processing as needed. Eventually, it may be desired to transfer the results to centralized processing and storage location for appropriate (e.g. more detailed or accurate) remote processing 495 and subsequent usages of actionable results as processed. Such steps may include generation and distribution of executable notices requesting collection of fines or performance of other corrective actions of public interest.

Figure 5B:
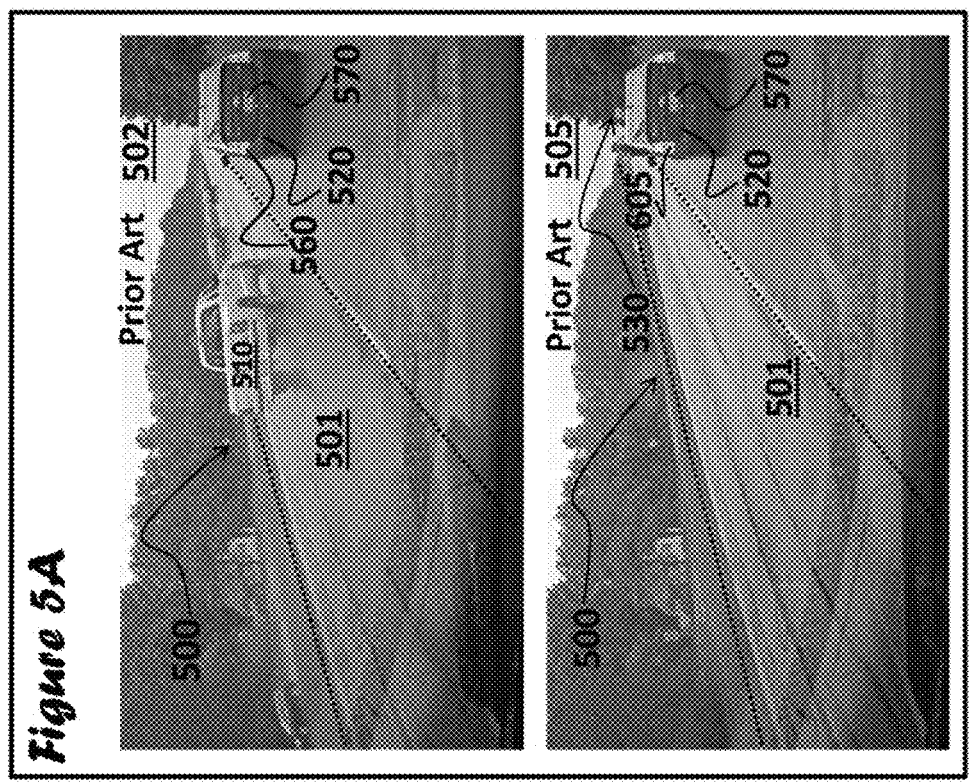
FIG. 5A and FIG. 5B are graphic illustrations of recordings video frames obtained from video cameras of the system as illustrated in FIG. 1 or FIG. 3 in accordance with the Prior Art (FIG. 5A) and the present invention (FIG. 5B).
Figure 5A:
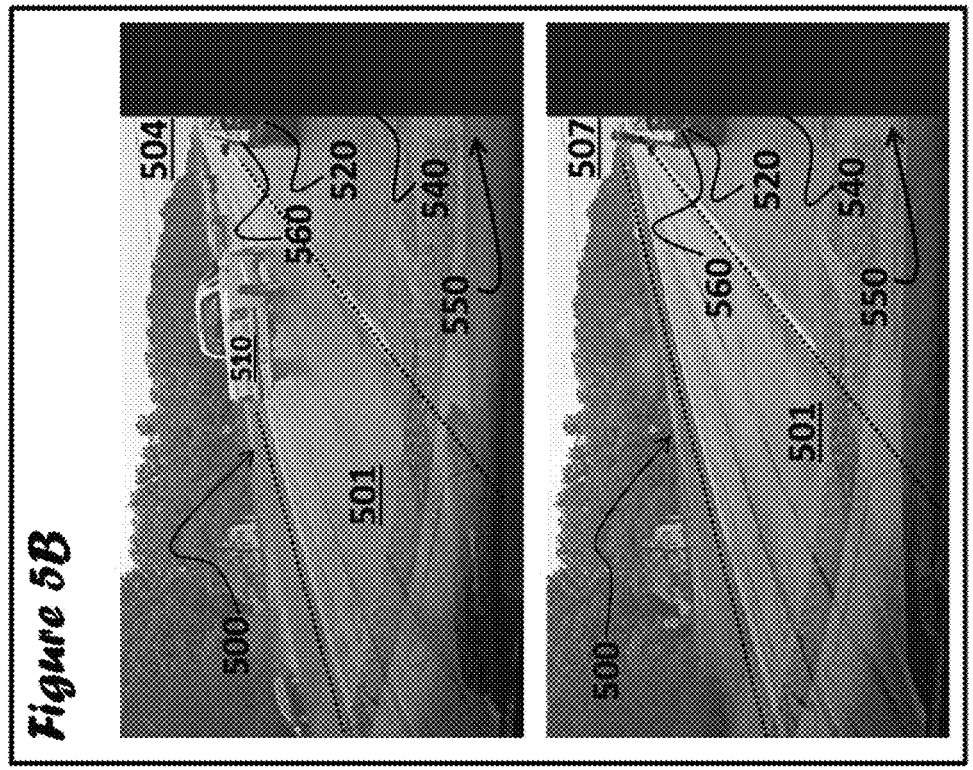

FIGS. 5A and 5B further support some significant safety features of the process 400. These features, as illustrated in the FIG. 5B and the FIG. 5B, pertain to the determinations derived from testing indicating that, in a significant number of traffic events and situations, the process 400 in general and steps 430 to 469 in particular may record events (including potential traffic violations) that are not connected (except by the accidents of proximity in space and time). For example, first traffic participant 510 that may violate SDMO laws and regulations and second traffic participant 520 under investigation for substantially unrelated reasons (e.g. traffic-related or other type of violation) may be present in the scene as recorded in a video frame 502 in accordance with prior art and a corresponding video frame 504 in accordance with the current invention. Similarly, another prior-art-related video frame 505 may incorporate recordings of privacy-protected, personal, or personalizable (i.e. uniquely attributable to the specific individual either by inspection or by additional data processing) data and/or information on an individual 530 undergoing questioning, processing, and/or interrogation.

In order to avoid at least complications, inefficiencies, and/or personal and legal rights violations and degradations, processing steps of the current invention have been prearranged to determine and exclude portions of video frames containing sets of pixels related to proprietary and/or personalizable information (i.e. contents directly related to legally-protected rights of privacy and safety of individuals or legal entities, and/or contents from which such information may be derivable and subsequently misused). For example, in the step 430 the boundaries 540 of the scene of interest may be chosen to exclude an exclusion area 550 from the video record either by not recording the pertinent set of pixels or by reframing and overwriting the appropriate segments of video frames before storing to exclude the recordings of the exclusion areas 550.

In some embodiments, the determination of the boundaries 540 may be conducted on the basis or automatic video frame processing associated with the step 430. Namely, when the scene of interest has been established, the initial sets of video frames that include traffic participants 520 may be analyzed for determination of signal light panels 560 and license plate area 570, for example using one of several feature extractions protocols for analysis of video images, and setting the boundaries 540 such that the license plate area 570 and its surroundings may be substantially completely absorbed by the area 550. In alternative or in addition, a set of pixels containing recognizable personal features (e.g. facial identifiers) of at least one traffic participant and/or traffic facilitator may be extracted and subsequently absorbed into the exclusion area 550.

It may be noted that such an automatic processing of the scenes of interest eliminates needs for potentially significant and expensive human efforts in order to protect privileged personalized information during additional processing, prosecution, litigation and resulting storage of pertinent information.

The present invention has been described with references to the exemplary embodiments arranged for different applications. While specific values, relationships, materials and components have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

We claim:

1. A system for detection and monitoring of traffic patterns and securely processing violation events regarding Slow-Down-Move-Over (SDMO) traffic regulations on at least one designated traffic surface comprising:

at least one mobile platform, equipped with at least one traffic monitoring and recording system for observation, monitoring, recording, storing and processing data pertinent to potential violations of a set of SDMO traffic regulations, pre-positioned in proximity of at least one traffic scene including the at least one traffic surface;

wherein the at least one traffic surface includes at least one traffic lane arranged to support traffic in at least one traffic direction; and wherein the at least one traffic monitoring and recording system includes at least one subsystem for imaging of at least one traffic participant traveling in the at least one direction in the at least one traffic lane, at least one processing/controlling subsystem arranged to process at least a portion of the data pertinent to the potential violations of a set of SDMO traffic regulations, and at least one communication subsystem arranged to facilitate communication and transfer of the data pertinent to the potential violation of a set of SDMO traffic regulations.

2. The system of claim 1, wherein the at least one mobile platform is at least one traffic monitoring patrol vehicle.

3. The system of claim 1, wherein the at least one traffic monitoring and recording system includes at least one velocity subsystem arranged to locate and measure time-dependent velocities of the at least one traffic participant traveling in the at least one direction in the at least one traffic lane, and at least one proximal presence subsystem arranged to detect presence of at least one proximal traffic participant traveling in the at least one direction in the at least one traffic lane during a predetermined time interval.

4. The system of claim 3, wherein the at least one velocity subsystem includes at least one electromagnetic wave radar device, while the at least one proximal presence subsystem includes at least one acoustic sensor.

5. The system of claim 3, wherein the at least one processing/controlling subsystem has been arranged and integrated with at least one recording/storing subsystem and at least one communication subsystem supported by at least one common electronic unit.

6. The system of claim 1, wherein the at least one mobile platform is arranged for modular installation and functionality in a vehicle having removable mechanical support and electrical energy and data conduits.

7. The system of claim 6, wherein the vehicle having removable mechanical support and electrical energy and data conduits is selected from the group of vehicles consisting of medical support vehicles, traffic inspection and maintenance SUV's and trucks, traffic signalization supporting and maintenance vehicles, infrastructure inspection vehicles, cleaning (mechanical, biological and chemical) decontamination vehicles, firefighting and disaster-response vehicles, working teams and crews-transporting vehicles, and combinations of the above.

8. A method for detection and monitoring of traffic patterns and securely processing violation events regarding Slow-Down-Move-Over (SDMO) traffic regulations on at least one designated traffic surface comprising:

selecting at least one location of interest and positioning at least one mobile platform, equipped with at least one traffic monitoring and recording system for observation, monitoring, recording, storing and processing data pertinent to potential violations of a set of SDMO traffic regulations, in proximity to at least one principal area of activity at the at least one location of interest;

determining at least one traffic scene of interest at the at least one location of interest and determining at least one boundary of at least one traffic lane pertinent to the at least one principal area of activity;

determining presence/absence and an incoming velocity of at least one traffic participant in at least one incoming portion of the at least one traffic lane;

recording at least one set of images and the incoming velocity of the at least one traffic participant in at least one incoming portion of the at least one traffic lane;

investigating presence/absence of the at least one traffic participant detected and measured in at least one incoming portion of the at least one traffic lane, in at least one portion of a proximal traffic lane adjacent to the at least one principal area of activity;

if the at least one detected and measured traffic participant is determined as absent from the at least one portion of the proximal traffic lane adjacent to the at least one principal area of activity, abandoning further observation of the at least one detected and measured traffic participant and abandoning the recorded at least one set of images and the incoming velocity of the at least one traffic participant in the at least one incoming portion of the at least one traffic lane;

if the at least one detected and measured traffic participant has been determined as present in the at least one portion of the proximal traffic lane adjacent to the at least one principal area of activity, recording at least another set of images and updated velocity of the at least one traffic participant and associating the at least another set of images and the updated velocity of the at least one traffic participant with the at least one set of images and the incoming velocity of the at least one traffic participant in at least one incoming portion of the at least one traffic lane;

investigating and comparing a sign of difference obtained by subtracting the incoming velocity from the updated velocity of the at least one traffic participant detected in at least one portion of the proximal traffic lane adjacent to the at least one principal area of activity and, if the sign of the difference is negative, abandoning further observation of the at least one detected and measured traffic participant and abandoning the recorded sets of images and the velocities of the at least one traffic participant;

if the sign of the difference is not negative, indicating and recording a significant probability of a violation of SDMO traffic regulations, and assembling and formatting the recorded sets of images and velocities into at least one database entry associated with the at least one traffic participant.

9. The method of claim 8, wherein the at least one set of images is derived from at least one predetermined segment of video recordings obtained by at least one video camera incorporated in the at least one mobile platform.

10. The method of claim 9, wherein the derivation of the at least one set of images from at least one predetermined segment of video recordings obtained by at least one video camera includes processing at least one video frame for determination, extraction and exclusion of at least one set of pixels containing legally-protected proprietary and personalizable information and contents.

11. The method of claim 10, wherein the at least one set of pixels containing legally-protected proprietary and personalizable information and contents includes pixels pertinent to at least one license plate of the at least one traffic-participant.

12. The method of claim 10, wherein the at least one set of pixels containing legally-protected proprietary and personalizable information and contents includes pixels pertinent to recognizable facial characteristics of at least one traffic participant or traffic facilitator.

13. The method of claim 8, wherein the at least one detected and measured traffic participant is determined as present in the at least one portion of the proximal traffic lane adjacent to the at least one principal area of activity by analysis of video recordings of corresponding the at least one incoming portion of the at least one traffic lane and the at least one outgoing portions of the at least one traffic lane.

14. The method of claim 8, wherein the at least one detected and measured traffic participant is determined as present in the at least one portion of the proximal traffic lane adjacent to the at least one principal area of activity by analysis of return signals of at least one proximal presence subsystem including at least one acoustic sensor.

15. The method of claim 8, wherein the incoming velocity of the at least one traffic participant present in at least one incoming portion of the at least one traffic lane is determined from measurements of at least one electromagnetic wave radar device.

16. The method of claim 8, wherein the updated velocity of the at least one traffic participant present in at least one outgoing portion of the at least one traffic lane is determined from measurements of at least another electromagnetic wave radar device.

17. The method of claim 8, further comprising additionally processing of the recorded sets of images and velocities pertinent to and associated with the at least one traffic participant and generating executable requests for corrective actions.

* * * * *